United States Patent
Ueno

(10) Patent No.: US 12,258,028 B2
(45) Date of Patent: Mar. 25, 2025

(54) VEHICLE CONTROL APPARATUS, VEHICLE CONTROL METHOD, AND NON-TRANSITORY STORAGE MEDIUM

(71) Applicant: TOYOTA JIDOSHA KABUSHIKI KAISHA, Toyota (JP)

(72) Inventor: Hiroshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 17/977,351

(22) Filed: Oct. 31, 2022

(65) Prior Publication Data

US 2023/0192107 A1 Jun. 22, 2023

(30) Foreign Application Priority Data

Dec. 20, 2021 (JP) .................................. 2021-206220

(51) Int. Cl.
*B60W 50/04* (2006.01)
*B60W 60/00* (2020.01)

(52) U.S. Cl.
CPC .......... *B60W 50/045* (2013.01); *B60W 60/00* (2020.02); *B60W 2520/125* (2013.01); *B60W 2520/14* (2013.01); *B60W 2556/10* (2020.02)

(58) Field of Classification Search
CPC .. B60W 50/045; B60W 60/00; B60W 256/10; B60W 2520/125; B60W 2520/14
USPC .......................................................... 701/1
See application file for complete search history.

(56) References Cited

U.S. PATENT DOCUMENTS

| | | | | |
|---|---|---|---|---|
| 7,774,103 B2* | 8/2010 | Deng | ...................... | B60T 8/172 701/1 |
| 8,690,772 B2* | 4/2014 | Hately | .................. | G06Q 40/08 600/595 |
| 11,639,178 B2* | 5/2023 | Teng | .................... | B60W 40/114 701/69 |
| 11,809,193 B2* | 11/2023 | Wu | ....................... | B60W 50/06 |
| 11,814,059 B1* | 11/2023 | Reschka | ............... | B60W 40/09 |
| 2004/0133326 A1* | 7/2004 | Ghoneim | ............... | B62D 6/007 701/1 |
| 2019/0176797 A1 | 6/2019 | Okubo et al. | | |

(Continued)

FOREIGN PATENT DOCUMENTS

| | | |
|---|---|---|
| JP | H08-202449 A | 8/1996 |
| JP | 2008-204125 A | 9/2008 |
| JP | 2009-255796 A | 11/2009 |

(Continued)

*Primary Examiner* — Andrew Joseph Rudy
(74) *Attorney, Agent, or Firm* — Oliff PLC

(57) ABSTRACT

A vehicle control apparatus includes one or more processors. The one or more processors are configured to set a second required value of a second state quantity to request an operation to a controlled object by using a first required value of a first state quantity on an operation of a vehicle from an in-vehicle system configured to set the first required value. The one or more processors are configured to set a feedback term of the second required value in feedback control by using a difference between the first required value and an actually measured value of the first state quantity. The one or more processors are configured to determine whether a component of the vehicle is degraded by using at least any one of a change history of the difference and a change history of the feedback term.

8 Claims, 6 Drawing Sheets

(56) References Cited

U.S. PATENT DOCUMENTS

2020/0070802 A1   3/2020   Yamada
2020/0094835 A1   3/2020   Itabashi

FOREIGN PATENT DOCUMENTS

| JP | 2020-032892 A | 3/2020 |
| JP | 2020-045077 A | 3/2020 |
| JP | 2021-156715 A | 10/2021 |
| WO | 2018/037815 A1 | 3/2018 |

\* cited by examiner

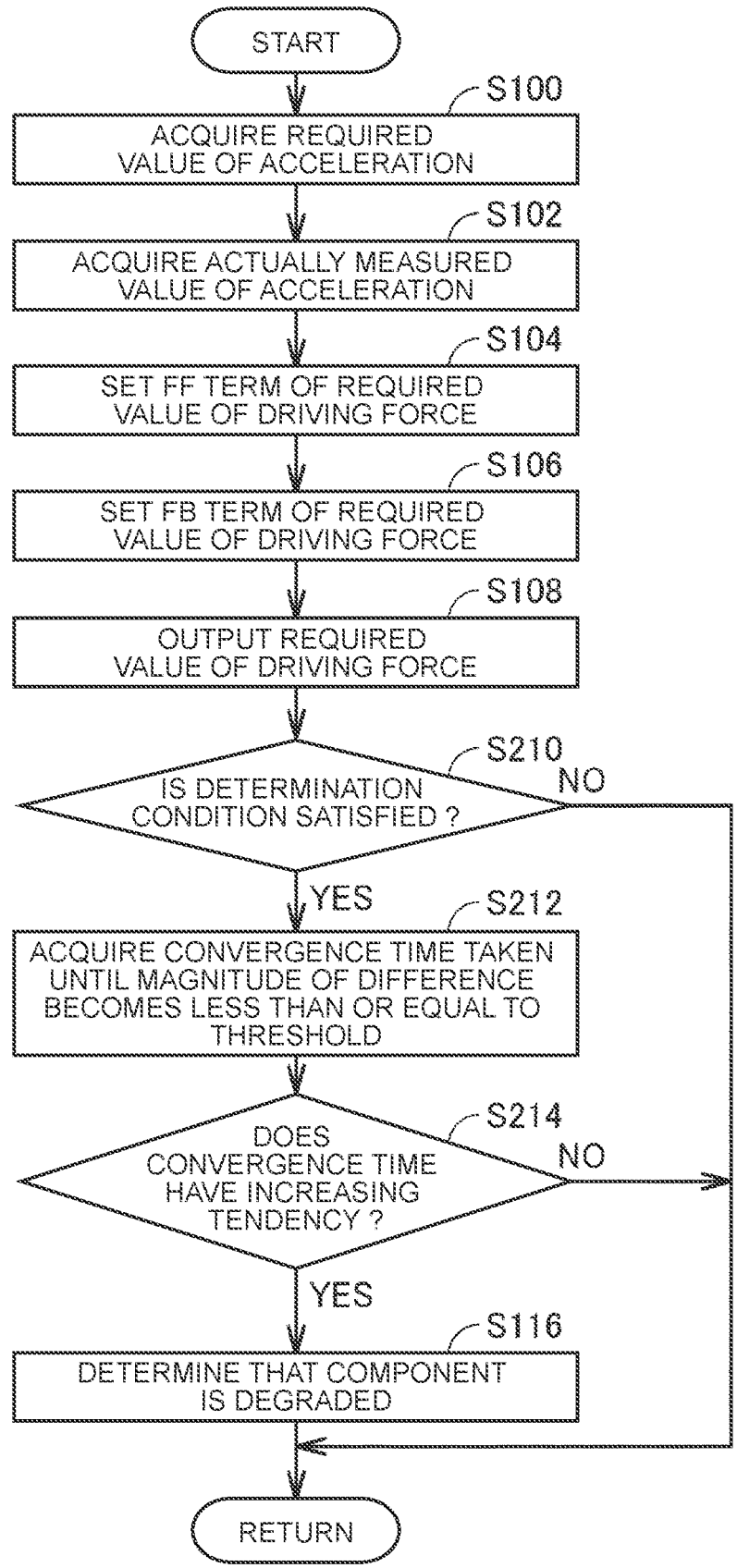

VEHICLE CONTROL APPARATUS, VEHICLE CONTROL METHOD, AND NON-TRANSITORY STORAGE MEDIUM

CROSS-REFERENCE TO RELATED APPLICATION

This application claims priority to Japanese Patent Application No. 2021-206220 filed on Dec. 20, 2021, incorporated herein by reference in its entirety.

BACKGROUND

1. Technical Field

The disclosure relates to a vehicle control apparatus, a vehicle control method, and a non-transitory storage medium.

2. Description of Related Art

There is known, for example, a vehicle capable of performing driving assistance with a driver assistance system, such as a system that assists a driver in driving operation and a system for performing autonomous driving. In such a vehicle, there is known, for example, a technology to generate driving force for achieving an operation required by a driver assistance system under feedback control using a required value (target value) and an actually measured value of acceleration of the vehicle.

For example, Japanese Unexamined Patent Application Publication No. 2020-045077 (JP 2020-045077 A) describes a technology to cause a drive unit to generate a braking and driving force based on a target braking and driving force calculated based on a required value of acceleration, and an availability indicating a range of braking and driving force that the drive unit is currently able to generate.

SUMMARY

In the above-described vehicle, if the driving force is controlled according to a difference between a required value and an actually measured value, a decrease in control response due to degradation or the like of components of the vehicle can be hard to appear in the behavior of the vehicle. Particularly, when autonomous driving is performed, the behavior of the vehicle is controlled without driving operation of the driver, and an occupant is difficult to become aware of a change in the behavior of the vehicle, so it is not easy to early detect the degradation or the like of a component of the vehicle or to anticipate the degradation of a component.

The disclosure provides a vehicle control apparatus, a vehicle control method, and a non-transitory storage medium capable of accurately detecting an abnormality, such as the degradation of a component of a vehicle.

A first aspect of the disclosure relates to a vehicle control apparatus. The vehicle control apparatus includes one or more processors. The one or more processors are configured to set a second required value of a second state quantity to request an operation to a controlled object by using a first required value of a first state quantity on an operation of a vehicle from an in-vehicle system configured to set the first required value. The one or more processors are configured to set a feedback term of the second required value in feedback control by using a difference between the first required value and an actually measured value of the first state quantity. The one or more processors are configured to determine whether a component of the vehicle is degraded by using at least any one of a change history of the difference and a change history of the feedback term.

When the component of the vehicle is degraded, a change such as an increase in the difference or the feedback term set in feedback control can occur. For this reason, it is possible to accurately determine whether the component of the vehicle is degraded by using a change history of the difference or a change history of the feedback term. Particularly, even in a driving situation in which it is difficult to become aware of a change in the behavior of the vehicle due to degradation, for example, during autonomous driving, it is possible to early detect the degradation of the component of the vehicle and to anticipate the degradation. As a result, it is possible to improve the reliability and safety of the vehicle.

In one embodiment, the feedback term may include an integral term. The one or more processors may be configured to determine that the component of the vehicle is degraded when a change history of the integral term is a change history indicating a predetermined increasing tendency.

When, for example, the degradation of the component of the vehicle occurs and a large difference between the first required value and the actually measured value continues, the integral term of the feedback term tends to increase as compared to that before degradation occurs. For this reason, when the change history of the integral term is a change history that indicates a predetermined increasing tendency, it is determined that the component of the vehicle is degraded. Thus, it is possible to accurately determine whether the component of the vehicle is degraded.

In one embodiment, the one or more processors may be configured to determine that the component of the vehicle is degraded when a period of time taken until the magnitude of the difference becomes less than or equal to a threshold indicates a predetermined increasing tendency.

For example, when the degradation of the component of the vehicle occurs, the period of time taken until the magnitude of the difference between the first required value and the actually measured value becomes less than or equal to the threshold tends to increase as compared to that before degradation occurs. For this reason, when the period of time taken until the magnitude of the difference becomes less than or equal to the threshold indicates a predetermined increasing tendency, it is determined that the component of the vehicle is degraded. Thus, it is possible to accurately determine whether the component of the vehicle is degraded.

In one embodiment, the first state quantity may include at least one of an acceleration of the vehicle in a longitudinal direction, an angular velocity of the vehicle in a yaw direction, and an acceleration of the vehicle in a lateral direction.

With this configuration, it is possible to accurately determine whether the component of the vehicle is degraded by using a change history of a difference between the first required value and the actually measured value of the acceleration of the vehicle in the longitudinal direction, the yaw direction, or the lateral direction, or a change history of the feedback term of the second required value set by using the difference.

In one embodiment, the component of the vehicle may include a component provided as a bush concerned with an operation of the vehicle.

With this configuration, it is possible to accurately determine whether the component provided as a bush, concerned with the operation of the vehicle, is degraded by using a change history of the difference or a change history of the feedback term.

In one embodiment, the one or more processors may be configured to set a feedforward term of the second required value in feedforward control by using the first required value.

With this configuration, when the second required value is set under feedforward control and feedback control, it is possible to accurately determine whether the component of the vehicle is degraded by using a change history of the difference or a change history of the feedback term.

A second aspect of the disclosure relates to a vehicle control method that is executed by a computer. The vehicle control method includes setting a second required value of a second state quantity to request an operation to a controlled object by using a first required value of a first state quantity on an operation of a vehicle from an in-vehicle system configured to set the first required value, setting a feedback term of the second required value in feedback control by using a difference between the first required value and an actually measured value of the first state quantity, and determining whether a component of the vehicle is degraded by using at least any one of a change history of the difference and a change history of the feedback term.

A third aspect of the disclosure relates to a non-transitory storage medium storing instructions that are executable by one or more processors and that cause the one or more processors to perform functions. The functions include setting a second required value of a second state quantity to request an operation to a controlled object by using a first required value of a first state quantity on an operation of a vehicle from an in-vehicle system configured to set the first required value, setting a feedback term of the second required value in feedback control by using a difference between the first required value and an actually measured value of the first state quantity, and determining whether a component of the vehicle is degraded by using at least any one of a change history of the difference and a change history of the feedback term.

According to the aspects of the disclosure, it is possible to provide a vehicle control apparatus, a vehicle control method, a non-transitory storage medium, and a motion manager capable of accurately detecting an abnormality, such as the degradation of a component of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart showing an example of a process that is executed in the calculation unit according to a modification.

DETAILED DESCRIPTION OF EMBODIMENTS

Figure 1:
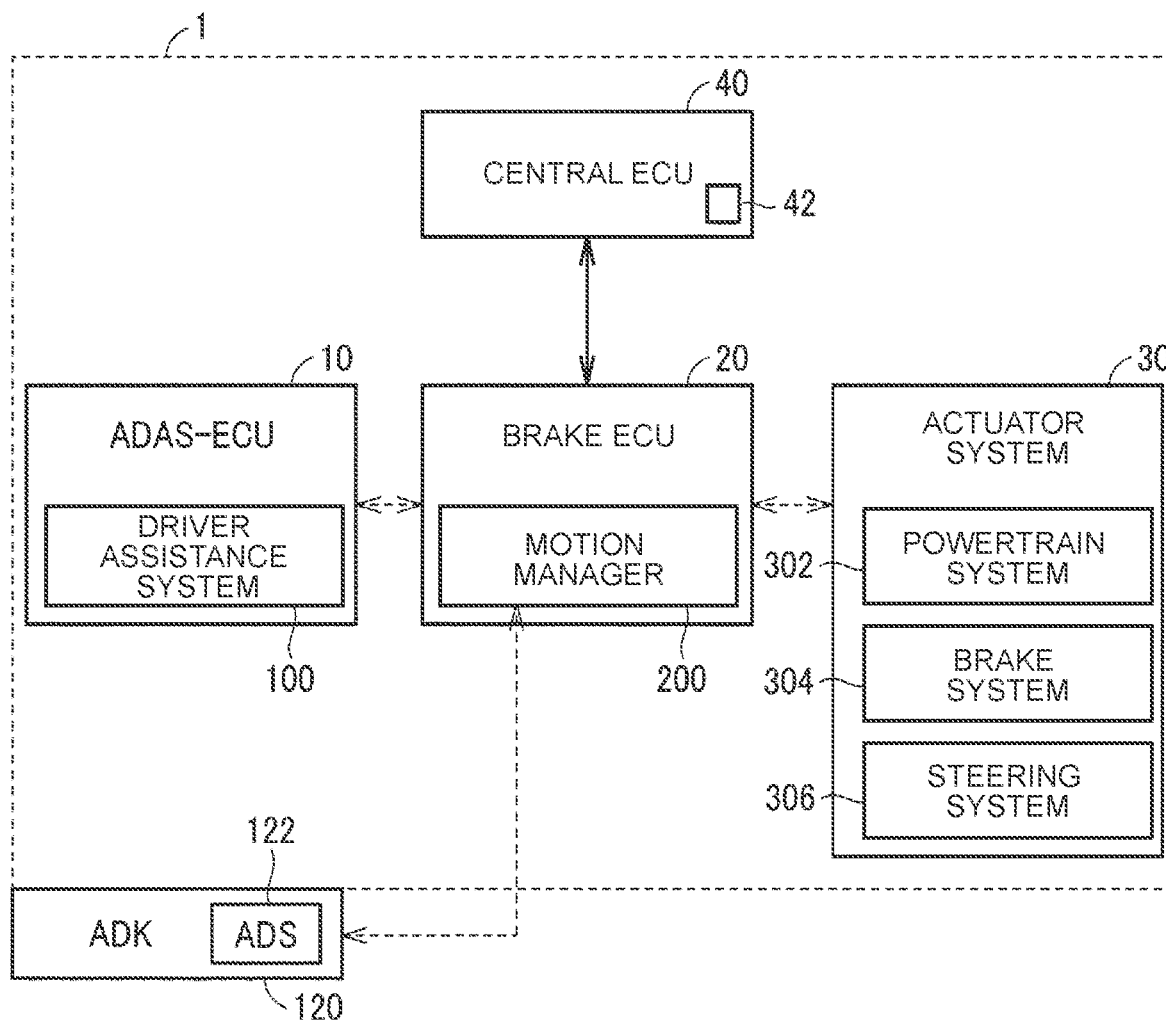
FIG. 1 is a block diagram that shows an example of the configuration of a vehicle.

Hereinafter, an embodiment of the disclosure will be described in detail with reference to the accompanying drawings. Like reference signs denote the same or corresponding portions in the drawings, and the description thereof will not be repeated.

FIG. 1 is a block diagram showing an example of the configuration of a vehicle 1. As shown in FIG. 1, the vehicle 1 includes an advanced driver assistance system (ADAS)-electronic control unit (ECU) 10, a brake ECU 20, an actuator system 30, a central ECU 40, and an autonomous driving kit (ADK) 120 that is an autonomous driving unit.

As long as the vehicle 1 has a configuration capable of implementing the function of a driver assistance system (described later), the vehicle 1 may be, for example, a vehicle that uses an engine as a driving source, or a battery electric vehicle that uses an electric motor as a driving source, or a hybrid electric vehicle that is equipped with an engine and an electric motor and that uses at least one of the engine and the electric motor as a driving source.

Each of the ADAS-ECU 10, the brake ECU 20, the central ECU 40, and the ADK 120 includes a computer that has a processor, such as a central processing unit (CPU), that runs programs, a memory, and an input and output interface.

The ADAS-ECU 10 includes a driver assistance system 100 having functions related to driving assistance of the vehicle 1. The driver assistance system 100 is configured to implement various functions for assisting in driving the vehicle 1, including at least one of steering control, drive control, and braking control of the vehicle 1, by executing an installed application. Examples of the application installed in the driver assistance system 100 include an application that implements the function of an automated valet parking system and an application (hereinafter, referred to as ADAS application) that implements the function of an advanced driver assistance system (ADAS).

The ADAS application includes, for example, at least any one of the following applications. The applications include an application that implements the function of following running while keeping an inter-vehicle distance from a vehicle ahead (adaptive cruise control (ACC) or the like) to run while keeping an inter-vehicle distance from a preceding vehicle at a constant distance, an application that implements the function of auto speed limiter (ASL) for recognizing a limit vehicle speed of the host vehicle and keeping the limit vehicle speed of the host vehicle, an application that implements lane keeping assistance (such as lane keeping assist (LKA) and lane tracing assist (LTA)) for keeping a running lane, an application that implements the function of collision mitigation brake (such as autonomous emergency braking (AEB) and pre-crash safety (PCS)) for automatically applying braking to mitigate collision, an application that implements the function of lane departure warning (such as lane departure warning (LDW) and lane departure alert (LDA)) for warning departure of the vehicle 1 from a driving lane, and an application that implements the function of intelligent speed assistance (ISA) for controlling the vehicle 1 such that the speed of the vehicle 1 does not exceed an upper limit speed.

Each of the applications of the driver assistance system 100 outputs a request for a kinematic plan ensuring marketability (function) of the application solely to the brake ECU 20 (more specifically, a motion manager 200) based on information about a vehicle surrounding situation acquired (input) from a plurality of sensors (not shown), a driver's assistance request, or the like. The plurality of sensors includes, for example, a vision sensor, such as a forward-facing camera, radar, light detection and ranging (LiDAR), or a location detector, or some or all of them. A kinematic plan is an example of a first required value.

The forward-facing camera is, for example, disposed on the back side of a rear-view mirror in a vehicle cabin and used to capture an image ahead of the vehicle 1. The radar is a distance measuring device that measures a distance and a direction to an object by applying short-wavelength radio waves to the object and detecting radio waves returned from the object. The LiDAR is a distance measuring device that measures a distance by applying pulsed laser light (light, such as infrared) to an object and calculating a time taken until the pulsed laser light reflects on the object and returns to the device. The location detector is, for example, global positioning system (GPS) that detects the location of the vehicle 1 by using information received from a plurality of satellites orbiting along the path around the earth.

Each of the applications acquires information about a vehicle surrounding situation, integrating detection results of the one or more sensors, as recognized sensor information and acquires a driver's assistance request via a user interface (not shown), such as a switch. Each of the applications is, for example, capable of identifying another vehicle, obstacle, or person around the vehicle by image processing using artificial intelligence (AI) or an image processing processor on an image or a video around the vehicle, acquired by the plurality of sensors.

The kinematic plan includes, for example, a request for a longitudinal acceleration or deceleration to be generated by the vehicle 1, a request for a steering angle of the vehicle 1, a request for hold during a stop of the vehicle 1, and the like. The longitudinal acceleration or deceleration to be generated by the vehicle 1 is an example of a first state quantity on the operation of the vehicle 1.

Examples of the request for the longitudinal acceleration or deceleration to be generated by the vehicle 1 include an operation request to a powertrain system 302 and an operation request to a brake system 304.

Examples of the request for hold during a stop of the vehicle 1 include a request to allow or stop activation of at least one of an electric parking brake and a parking lock mechanism (both are not shown).

The electric parking brake, for example, restricts rotation of wheels of the vehicle 1 by operation of an actuator. The electric parking brake may be, for example, configured to restrict rotation of the wheels by actuating a brake for a parking brake, provided at one or some of the wheels of the vehicle 1, with an actuator. Alternatively, the electric parking brake may restrict rotation of the wheels by regulating hydraulic pressure supplied to a braking device of the brake system 304 by operating the actuator for parking brake to actuate the braking device.

The parking lock mechanism restricts rotation of an output shaft of a transmission by operation of an actuator. The parking lock mechanism, for example, fits a protrusion to teeth of a gear (lock gear) provided so as to be coupled to a rotating element in the transmission of the vehicle 1. The protrusion is provided at the distal end of a parking lock pawl of which the position is adjusted by an actuator. Thus, rotation of the output shaft of the transmission, and rotation of the drive wheels is restricted.

Applications installed in the driver assistance system 100 are not limited to the above-described applications. An application that implements another function may be added, the existing application may be omitted, and the number of installed applications is not limited.

In the present embodiment, the ADAS-ECU 10 includes the driver assistance system 100 having a plurality of applications. Alternatively, an ECU may be provided for each application. For example, the driver assistance system 100 may include an ECU in which an application that implements the function of the automated valet parking system is installed and an ECU in which an ADAS application is installed.

The ADK 120 includes an autonomous driving system (ADS) 122. The ADK 120 is configured to be detachable from the vehicle 1 and is configured to be replaceable with another ADK. The ADS 122 has an application that implements the function of autonomous driving. The ADS 122 outputs a request for a kinematic plan (that is, a kinematic plan for performing autonomous driving) ensuring the marketability (function) with an application solely to the brake ECU 20 based on, for example, information about a vehicle surrounding situation acquired from the plurality of sensors mounted on the ADK 120 or the vehicle 1. The plurality of sensors mounted on the ADK 120 includes, for example, a vision sensor, such as a forward-facing camera, radar, light detection and ranging (LiDAR), or a location detector, or some or all of them. These sensors are as described above, so the detailed description thereof will not be repeated. For example, in a section from a current location to a preset destination or in part of the section, autonomous driving is performed by performing at least any one of operations of acceleration and deceleration, steering, and stop of the vehicle 1 according to a situation around the vehicle 1 without driver's operation. In the present embodiment, the ADS 122 is configured be capable of acquiring a situation around the vehicle 1 from a sensor or an image processing device in a different line from the driver assistance system 100.

The application that implements the function of autonomous driving may, for example, include the driver assistance system 100 or may be installed in an ECU different from the ADAS-ECU 10.

The brake ECU 20 includes the motion manager 200. In the present embodiment, the case where the brake ECU 20 is a hardware configuration that includes the motion manager 200 will be described as an example. The motion manager 200 may be provided as an ECU separately from the brake ECU 20 or may be included in another ECU different from the brake ECU 20. The brake ECU 20 is configured to be able to communicate with each of the ADAS-ECU 10, various ECUs included in the actuator system 30, the central ECU 40, and the ADK 120.

The motion manager 200 makes a request to the actuator system 30 for the motion of the vehicle 1 in accordance with a kinematic plan set by at least any one of the plurality of applications of the driver assistance system 100 and the application that implements the function of autonomous driving of the ADS 122. The detailed configuration of the motion manager 200 will be described later.

The actuator system 30 is configured to realize a request for the motion of the vehicle 1, output from the motion manager 200. The actuator system 30 includes a plurality of actuators. FIG. 1 shows, for example, the case where the actuator system 30 includes the powertrain system 302, the brake system 304, and a steering system 306 as actuators. The number of actuators to which the motion manager 200 issues a request is not limited to three as described above and may be four or more or two or less.

The powertrain system 302 includes a powertrain capable of generating the driving force of the drive wheels of the vehicle 1, and an ECU that controls the operation of a powertrain (both are not shown). The powertrain includes, for example, at least any one of an internal combustion engine, such as a gasoline engine and a diesel engine, a transmission including a change gear, a differential unit, and the like, a motor generator serving as a driving source, an electrical storage device that stores electric power to be supplied to the motor generator, a power conversion device that converts electric power between the motor generator and the electrical storage device, a power generation source, such as a fuel cell, and the like. The ECU that controls the operation of the powertrain controls an associated device(s) in the powertrain system 302 such that a motion request to the associated device(s) from the motion manager 200 is realized.

The brake system 304 includes, for example, a plurality of braking devices respectively provided in the wheels of the vehicle 1. Each of the braking devices includes, for example, a hydraulic brake, such as a disc brake, that generates braking force by using hydraulic pressure. The braking device may further include, for example, a motor generator that is connected to the wheels and that generates regenerative torque. The braking operation of the vehicle 1 using the plurality of braking devices is controlled by the brake ECU 20. The brake ECU 20 includes, for example, a control unit (not shown) for controlling the brake system 304 separately from the motion manager 200.

The steering system 306 includes, for example, a steering device capable of changing the steering angle of steered wheels (for example, front wheels) of the vehicle 1, and an ECU that controls the operation of the steering device (both are not shown). The steering device includes, for example, a steering wheel that changes the steering angle according to an operation amount, and an electric power steering (EPS) capable of adjusting the steering angle with an actuator separately from operation of the steering wheel. The ECU that controls the operation of the steering device controls the operation of an actuator of the EPS.

The central ECU 40 includes a content updatable memory 42. The central ECU 40 is, for example, configured to be able to communicate with the brake ECU 20 and configured to be able to communicate with a device (for example, a server) (not shown) outside the vehicle 1 via a communication module (not shown). The central ECU 40 updates information stored in the memory 42 with update information that the central ECU 40 receives from the server outside the vehicle 1. Predetermined information is stored in the memory 42. The predetermined information includes, for example, information read from various ECUs at system startup of the vehicle 1.

In the present embodiment, the central ECU 40 reads the predetermined information from various ECUs at system startup of the vehicle 1. Alternatively, the central ECU 40 may have a function (gateway function) of, for example, relaying communication between various ECUs.

Figure 2:
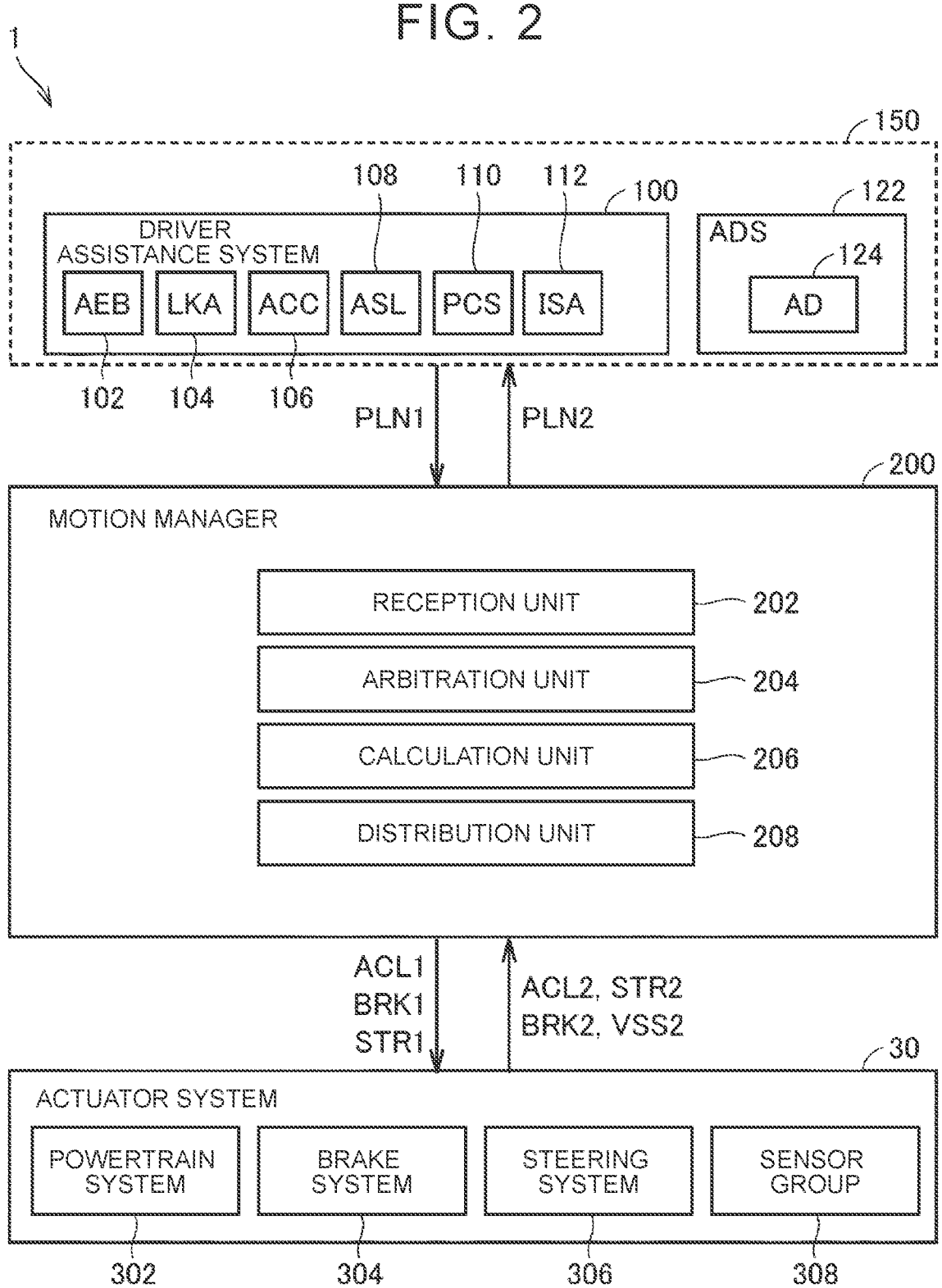
FIG. 2 is a block diagram for illustrating an example of the operation of a motion manager.

Hereinafter, an example of the operation of the motion manager 200 will be described in detail with reference to FIG. 2. FIG. 2 is a block diagram for illustrating an example of the operation of the motion manager 200.

FIG. 2 shows a system group 150 that includes the driver assistance system 100 and the ADS 122. FIG. 2 shows an example of the case where the driver assistance system 100 includes, for example, the AEB 102, the LKA 104, the ACC 106, the ASL 108, the PCS 110, and the ISA 112 as applications. Furthermore, FIG. 2 shows the case where the ADS 122 includes, for example, an AD 124 that is an application that implements the function of autonomous driving (AD). A request for a kinematic plan set in at least any one of the plurality of applications is sent as a request signal PLN1 from the system group 150 including the driver assistance system 100 and the ADS 122 to the motion manager 200.

Examples of the request signal PLN1 include information about a target acceleration set as one kinematic plan in ACC, AEB, ASL, PCS, ISA, or AD, information about a target curvature set as one kinematic plan in LKA or AD.

The motion manager 200 sets a motion request to the vehicle 1 based on the request for a kinematic plan, included in the received request signal PLN1, and issues a request to the actuator system 30 to realize the set motion. In other words, the motion manager 200 sends a request for the operation of the powertrain system 302 to the actuator system 30 as a request signal ACL1. The motion manager 200 sends a request for the operation of the brake system 304 to the actuator system 30 as a request signal BRK1. In addition, the motion manager 200 sends a request for the operation of the steering system 306 to the actuator system 30 as a request signal STR1.

The request signal ACL1 contains, for example, information on a required value of driving torque or driving force, information on how to arbitrate (for example, whether to select a maximum value or a minimum value and whether to change in a stepwise manner or gradually, and the like.

The request signal BRK1 contains, for example, information on a required value of braking torque, information on how to arbitrate (for example, whether to select a maximum value or a minimum value and whether to change in a stepwise manner or gradually, or the like), information about braking execution timing (whether to immediately perform, or the like), and the like.

The request signal STR1 contains, for example, a target steering angle, information about whether the target steering angle is effective, information on upper and lower limit torques of assist torque to operate the steering wheel, and the like.

Of the plurality of actuators that make up the actuator system 30, the actuator that has received an associated request signal is controlled to realize the request for operation, contained in the request signal.

Hereinafter, an example of the configuration of the motion manager 200 will be described. As shown in FIG. 2, the motion manager 200 includes a reception unit 202, an arbitration unit 204, a calculation unit 206, and a distribution unit 208.

The reception unit 202 receives a request for a kinematic plan, output from one or more applications of the system group 150. The details of a kinematic plan in the present embodiment will be described later.

The arbitration unit 204 arbitrates a plurality of requests for kinematic plans, received from the applications via the reception unit 202. This arbitration process is, for example, to select one kinematic plan from among a plurality of kinematic plans based on predetermined selection criteria. Another example of the arbitration process is to set a new kinematic plan based on a plurality of kinematic plans. The arbitration unit 204 may arbitrate a plurality of requests for kinematic plans by further adding predetermined information received from the actuator system 30. The arbitration unit 204 may determine whether to temporarily give priority to the motion of the vehicle 1 desired according to a driver status and a vehicle status over the motion of the vehicle 1, corresponding to the kinematic plan determined based on an arbitrated result.

The calculation unit 206 calculates a motion request based on the arbitrated result of the requests for kinematic plans in the arbitration unit 204 and the motion of the vehicle 1, determined based on the arbitrated result. The motion request is a physical quantity for controlling at least any one of the actuators of the actuator system 30 and contains a physical quantity different from the physical quantity of a request for a kinematic plan. When, for example, a request for a kinematic plan (first request) is a longitudinal acceleration, the calculation unit 206 calculates a value obtained by converting an acceleration to a driving force or driving torque as a motion request (second request). A motion request is an example of a second required value.

The distribution unit 208 distributes the motion request calculated by the calculation unit 206 to at least one actuator of the actuator system 30. When, for example, the vehicle 1 is required to accelerate, the distribution unit 208 distributes the motion request to only the powertrain system 302. Alternatively, when the vehicle 1 is required to decelerate, the distribution unit 208 appropriately distributes the motion request to the powertrain system 302 and the brake system 304 to achieve a target deceleration.

The powertrain system 302 of the actuator system 30 sends information about the status of the powertrain system 302 to the motion manager 200 as a signal ACL2. Examples of the information about the status of the powertrain system 302 include information on operation of an accelerator pedal, information on an actual driving torque or actual driving force of the powertrain system 302, actual shift range information, information about upper and lower limits of driving torque, information on upper and lower limits of driving force, and information on the reliability of the powertrain system 302.

The brake system 304 of the actuator system 30 sends information about the status of the brake system 304 to the motion manager 200 as a signal BRK2. Examples of the information about the status of the brake system 304 include information on operation of a brake pedal, information on braking torque required by a driver, information on a required value of braking torque after arbitration, information on actual braking torque after arbitration, and information on the reliability of the brake system 304.

The steering system 306 of the actuator system 30 sends information about the status of the steering system 306 to the motion manager 200 as a signal STR2. Examples of the information about the status of the steering system 306 include information on the reliability of the steering system 306, information about whether the driver is gripping the steering wheel, information on torque to operate the steering wheel, and information on the rotation angle of the steering wheel.

The actuator system 30 includes a sensor group 308 in addition to the powertrain system 302, the brake system 304, and the steering system 306.

The sensor group 308 includes a plurality of sensors that detect the behavior of the vehicle 1. The sensor group 308 includes, for example, a longitudinal G sensor that detects a vehicle body acceleration in a longitudinal direction of the vehicle 1, a lateral G sensor that detects a vehicle body acceleration in a lateral direction of the vehicle 1, a wheel speed sensor that is provided in each of the wheels and that detects a wheel speed, and a yaw rate sensor that detects the angular velocity of a rotation angle in a yaw direction (yaw angle). The sensor group 308 sends information containing detection results of the plurality of sensors to the motion manager 200 as a signal VSS2. In other words, the signal VSS2 contains, for example, a detected value of the longitudinal G sensor, a detected value of the lateral G sensor, a detected value of the wheel speed sensor of each wheel, a detected value of the yaw rate sensor, and information on the reliability of each of the sensors.

When the motion manager 200 receives various signals received from the actuator system 30, the motion manager 200 sends predetermined information to the driver assistance system 100 as a signal PLN2.

The configuration of the devices mounted on the vehicle 1 and the configuration of the motion manager 200, described above, are one example and may be added, replaced, changed, omitted, or the like as needed. The functions of the devices may be executed by integrating the devices into a single device or separating any one of the devices into multiple devices as needed.

In the thus configured vehicle 1, the calculation unit 206 of the motion manager 200, for example, arbitrates a required value of the longitudinal acceleration of the vehicle 1 from an in-vehicle system (including the ADS 122 and the driver assistance system 100), sets a required value of driving force corresponding to the arbitrated required value of acceleration, and outputs the set required value of driving force to the actuator system 30. At this time, the calculation unit 206 sets a required value of driving force corresponding to the required value of acceleration after arbitration by using feedforward control (hereinafter, referred to as FF control) and feedback control (hereinafter, referred to as FB control). The calculation unit 206, for example, sets the sum of a feedforward term corresponding to the required value of acceleration after arbitration and a feedback term corresponding to a difference between the required value of acceleration after arbitration and an actually measured value of acceleration, as a required value of driving force. For example, PID control is included as the feedback control.

Figure 3:
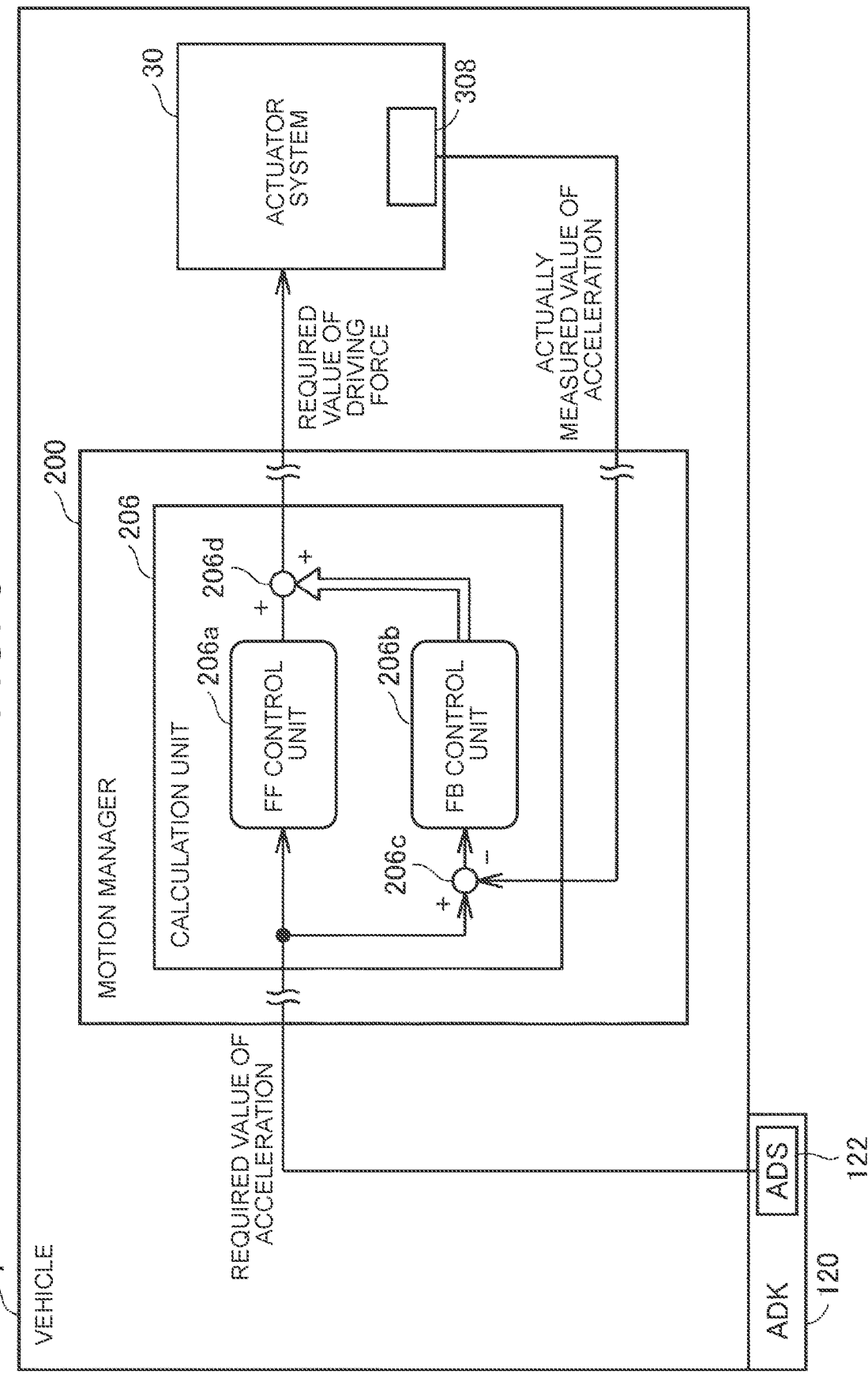
FIG. 3 is a block diagram for illustrating an example of a process of FB control and FF control that are executed in a calculation unit.

FIG. 3 is a diagram for illustrating an example of the process of FF control and FB control that are executed in the calculation unit 206. For example, during autonomous driving, a required value of acceleration, set in the ADS 122, is input to the reception unit 202 of the motion manager 200. The required value of acceleration, input to the reception unit 202, is output to the arbitration unit 204 and is arbitrated with a required value of another acceleration in the arbitration unit 204. A required value of acceleration after arbitration is input to the calculation unit 206. The calculation unit 206 sets a required value of driving force by using the required value of acceleration after arbitration, input from the arbitration unit 204.

The calculation unit 206 includes an FF control unit 206a and an FB control unit 206b. The FF control unit 206a sets an FF term of the required value of driving force by using a required value of acceleration after arbitration. The FF control unit 206a, for example, sets driving force for achieving the required value of acceleration after arbitration as an FF term in consideration of running resistance or the like. The FF control unit 206a sets an FF term using a required value of acceleration by using, for example, a mathematical expression, a function, a map, a table, or the like expressing a predetermined relationship between a required value of acceleration and an FF term. The predetermined relationship is adapted, for example, empirically or by design. The FF control unit 206a outputs a set FF term.

The FB control unit 206b sets an FB term of a required value of driving force by using a difference between a required value of acceleration after arbitration and an actually measured value in the longitudinal direction of the vehicle 1. A difference between a required value of acceleration, calculated at a summing point 206c and an actually measured value of acceleration is input to the FB control unit 206b. An actually measured value of acceleration is input from the sensor group 308 of the actuator system 30. The FB control unit 206b sets an FB term of a required value of driving force according to the difference. The FB term includes a proportional term set in proportion to the difference, an integral term set in proportion to a time integral of the difference, and a derivative term set in proportion to a time derivative of the difference in PID control. The FB control unit 206b outputs the set FB term.

The sum of the FF term output from the FF control unit 206a and the FB term output from the FB control unit 206b is calculated at a summing point 206d, and the calculated sum is output to the actuator system 30 via the distribution unit 208 as a required value of driving force.

When an FB term is set according to a difference between a required value of acceleration and an actually measured value of acceleration in the above-described feedback control, a decrease in control response due to the degradation or the like of a component of the vehicle 1 (for example, a component provided as a bush and concerned with the operation of the vehicle 1 and the operation of the powertrain system 302 that is a controlled object) can be difficult to appear in the behavior of the vehicle 1. Particularly, when autonomous driving is performed, the behavior of the vehicle 1 is controlled without driving operation of the driver, and an occupant is difficult to become aware of a change in the behavior of the vehicle 1, so it is not easy to early detect the degradation or the like of a component of the vehicle 1 or to anticipate the degradation of a component. Examples of the bush include not only bushes provided in the powertrain system 302, the brake system 304, and the steering system 306 but also bushes provided in a suspension system, such as movable parts of suspensions of the vehicle 1.

In the present embodiment, the calculation unit 206 of the motion manager 200 determines whether the component of the vehicle 1 is degraded by using a change history of the FB term.

If the component of the vehicle 1 is degraded, a large difference state continues, and a change, such as an increase in FB term (particularly, integral term) set in FB control, can occur. For this reason, it is possible to accurately determine whether the component of the vehicle 1 is degraded by using a change history of the FB term.

Figure 4:
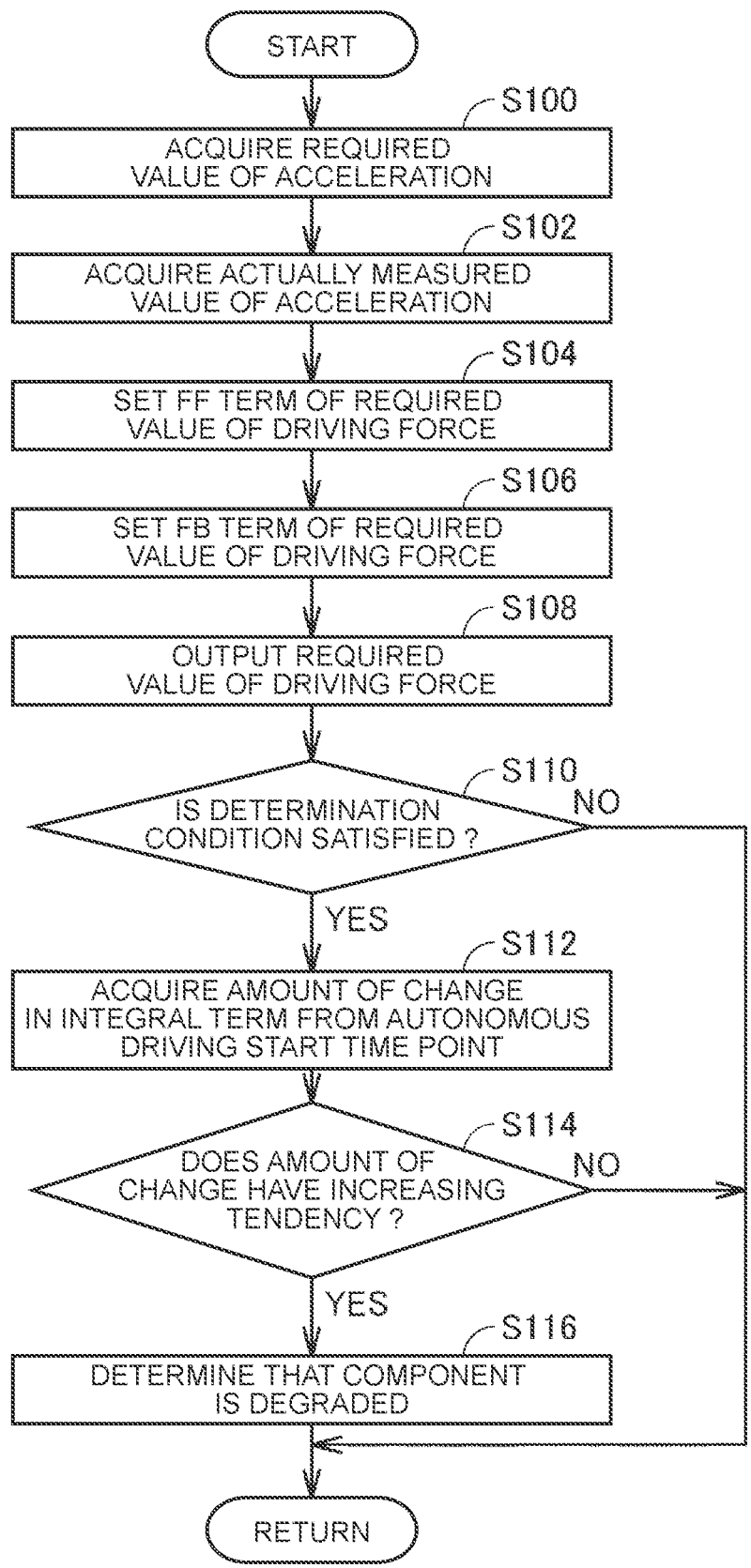
FIG. 4 is a flowchart showing an example of a process that is executed in the calculation unit.

Hereinafter, a process that is executed in the calculation unit 206 of the motion manager 200 will be described with reference to FIG. 4. FIG. 4 is a flowchart showing an example of the process that is executed in the calculation unit 206. A series of processes shown in the flowchart is repeatedly executed by the calculation unit 206 at predetermined control intervals.

In step (hereinafter, "step" is abbreviated as "S") 100, the calculation unit 206 acquires a required value of acceleration in the longitudinal direction of the vehicle 1. The calculation unit 206, for example, acquires a required value of acceleration in the longitudinal direction of the vehicle 1 after arbitration from the arbitration unit 204.

In S102, the calculation unit 206 acquires an actually measured value of acceleration in the longitudinal direction of the vehicle 1. The calculation unit 206, for example, acquires an actually measured value of acceleration in the longitudinal direction of the vehicle 1 by using detection results of the G sensors included in the sensor group 308 of the actuator system 30. The detection results of the G sensors included in the sensor group 308 are, for example, input to the calculation unit 206 via the reception unit 202.

In S104, the calculation unit 206 sets an FF term of a required value of driving force. A method of setting an FF term is as described above, so the detailed description thereof will not be repeated.

In S106, the calculation unit 206 sets an FB term of a required value of driving force. A method of setting an FB term is as described above, so the detailed description thereof will not be repeated.

In S108, the calculation unit 206 outputs the sum of the FF term and the FB term to the actuator system 30 via the distribution unit 208 as a required value of driving force.

In S110, the calculation unit 206 determines whether a determination condition is satisfied. Examples of the determination condition include a condition that a travel distance from when autonomous driving is started is longer than or equal to a predetermined distance L. The calculation unit 206 determines that autonomous driving is started when the status of a flag changes from an off state to an on state. The status of the flag is set to the on state when autonomous driving is started by operation of a user, or the like, and is set to the off state when autonomous driving is stopped. The calculation unit 206 may, for example, calculate a travel distance by using a change history of the speed of the vehicle 1 during autonomous driving, may calculate a travel distance by using a change history of the wheel speed of the vehicle 1 during autonomous driving and a tire diameter, or may calculate a travel distance by using the location detector, such as GPS. When the calculation unit 206 determines that the determination condition is satisfied (YES in S110), the process proceeds to S112. When the calculation unit 206 determines that the determination condition is not satisfied (NO in S110), the process ends.

In S112, the calculation unit 206 acquires the amount of change from an autonomous driving start time point for the integral term in the FB term. The calculation unit 206 acquires the amount of change in integral term from the autonomous driving start time point by subtracting the value of the integral term at the autonomous driving start time point from a current value of the integral term. It is assumed that the "amount of change in integral term" in the following description indicates the amount of change in integral term from the autonomous driving start time point.

In S114, the calculation unit 206 determines whether the amount of change in integral term has a predetermined increasing tendency. Specifically, the calculation unit 206, for example, sets, as a reference value, the amount of change in integral term when the vehicle 1 has traveled a predetermined distance L during last or former autonomous driving and, when the amount of change in integral term has increased by a predetermined value or more from the reference value, determines that the amount of change in integral term has a predetermined increasing tendency.

The reference value may be, for example, the amount of change in integral term during first autonomous driving in which the vehicle 1 has traveled a predetermined distance L, the average value of the amount of change in integral term when the vehicle 1 has traveled a plurality of predetermined distances L from first autonomous driving to last autonomous driving, or the average value within an immediately preceding predetermined period of the amounts of change in integral term when the vehicle 1 has traveled a plurality of predetermined distances L.

When the calculation unit 206 determines that the amount of change in integral term has a predetermined increasing tendency (YES in S114), the process proceeds to S116. When the calculation unit 206 determines that the amount of change in integral term has no predetermined increasing tendency (NO in S114), the process ends.

In S116, the calculation unit 206 determines whether the component is degraded. The calculation unit 206, for example, sets a flag indicating that the component provided as a bush is degraded, to the on state.

When the flag is in the on state, the motion manager 200 may inform a user of information indicating that the component is degraded. The motion manager 200 may display text information or an image indicating that the component is degraded on a display device or the like or may inform the user by voice or the like. Alternatively, when the flag is in the on state, the motion manager 200 may send information indicating that the component is degraded to a device (for example, the server) outside the vehicle 1 (not shown) via the central ECU 40 and a communication module.

Figure 5:
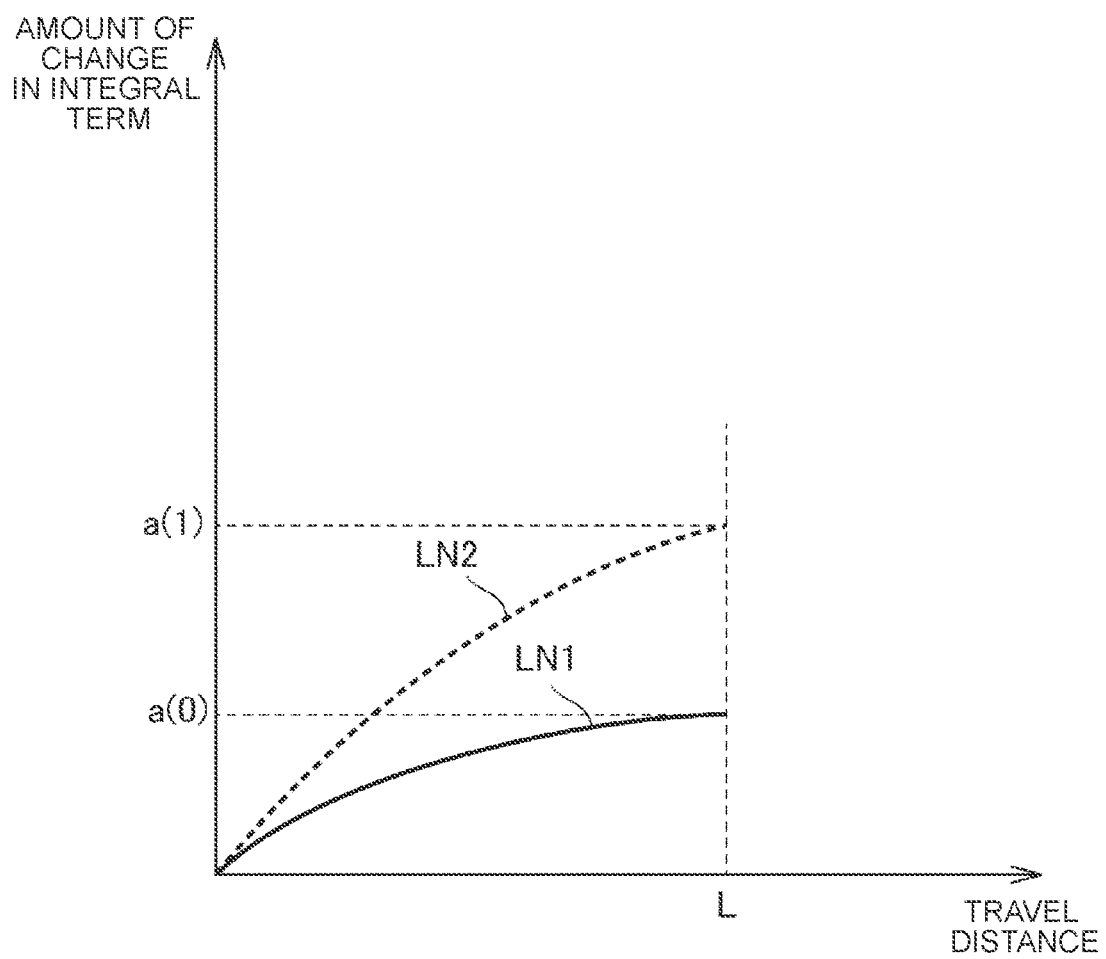
FIG. 5 is a graph showing an example of a change history of an amount of change in integral term.

An example of the operation of the vehicle 1 based on the above-described structure and flowchart will be described with reference to FIG. 5. FIG. 5 is a graph showing an example of a change history of the amount of change in integral term. The ordinate axis of FIG. 5 represents the amount of change in integral term of the FB term. The abscissa axis of FIG. 5 represents a travel distance of the vehicle 1. In FIG. 5, LN1 represents a change history of the amount of change in integral term before the component is degraded. In FIG. 5, LN2 represents a change history of the amount of change in integral term after the component is degraded. It is assumed that an amount of change a(0) in integral term corresponding to a predetermined distance L in LN2 of FIG. 5 is set for a reference value.

For example, during autonomous driving, when a required value of acceleration in the longitudinal direction of the vehicle 1 is acquired (S100) and an actually measured value of acceleration in the longitudinal direction of the vehicle 1 is acquired (S102), an FF value is set by using the acquired required value (S104). Then, an FB term is set by using a difference between the acquired required value and actually measured value (S106), and the sum of the FF term and the FB term is output as a required value of driving force (S108).

At this time, the amount of change in integral term of the FB term increases from the autonomous driving start time point as indicated by LN1 and LN2 in FIG. 5. The amount of change in integral term after the component is degraded changes so as to increase by a larger amount than the amount of change in integral term before the component is degraded.

Therefore, when the amount of change in integral term from the autonomous driving start time point changes in accordance with LN2 of FIG. 5, and when the determination condition is satisfied when a travel distance from the autonomous driving start time point becomes longer than or equal to a predetermined distance L (YES in S110), an amount of change a(1) in integral term is acquired. When a value obtained by subtracting the reference value a(0) from the acquired amount of change a(1) in integral term is greater than a threshold, the calculation unit 206 determines that the amount of change has an increasing tendency (S114) and determines that the component is degraded (S116).

When the value obtained by subtracting the reference value a(0) from the acquired amount of change in integral term is less than or equal to a threshold, the calculation unit 206 determines that the amount of change has no increasing tendency (NO in S114), and driving of the vehicle 1 is continued without determination that the component is degraded.

As described above, with the motion manager 200 that is the vehicle control apparatus according to the present embodiment, when the component, such as a bush, of the vehicle 1 is degraded, a change, such as an increase in FB term set in FB control, can occur. For this reason, it is possible to accurately determine whether the component of the vehicle 1 is degraded by using a change history of the FB term. Particularly, even in a driving situation in which it is difficult to become aware of a change in the behavior of the vehicle 1 due to degradation, for example, during autonomous driving, it is possible to early detect the degradation of the component of the vehicle 1 and to anticipate the degradation. As a result, it is possible to improve the reliability and safety of the vehicle 1. Therefore, it is possible to provide a vehicle control apparatus, a vehicle control method, a non-transitory storage medium, and a motion manager capable of accurately detecting an abnormality, such as the degradation of a component of the vehicle 1.

For example, when a large difference between a required value of acceleration and an actually measured value of acceleration continues after the component of the vehicle 1 is degraded, the integral term of the FB term tends to increase as compared to before degradation. For this reason, when the change history of the integral term is a change history that indicates a predetermined increasing tendency, it is determined that the component of the vehicle 1 is degraded. Thus, it is possible to accurately determine whether the component of the vehicle 1 is degraded.

Hereinafter, modifications will be described. In the above-described embodiment, the configuration in which the motion manager 200 includes the reception unit 202, the arbitration unit 204, the calculation unit 206, and the distribution unit 208 has been described as an example. Alternatively, the motion manager 200 may include, for example, a first motion manager that receives a kinematic plan from at least an application and a second motion manager that is able to communicate with the first motion manager and that issues a motion request to the actuator system 30. In this case, the function of the arbitration unit 204, the function of the calculation unit 206, and the function of the distribution unit 208 may be implemented in any one of the first motion manager and the second motion manager.

In the above-described embodiment, the case where the determination condition includes a condition in which the vehicle 1 has traveled a predetermined distance L from when autonomous driving is started has been described as an example. Alternatively, the determination condition may include a condition in which the vehicle 1 has traveled a predetermined distance L after control for setting a required value of driving force or the like through FB control is started by running at least one of the plurality of applications set in the driver assistance system 100.

In the above-described embodiment, PID control is included as FB control. Alternatively, for example, PI control may be included instead of PID control.

In the above-described embodiment, when the change history of the integral term is a change history indicating a predetermined increasing tendency, it is determined that the component of the vehicle 1 is degraded. Alternatively, for example, when a change history of the proportional term instead of the integral term is a change history indicating a predetermined increasing tendency, it may be determined that the component of the vehicle 1 is degraded.

In the above-described embodiment, when the change history of the integral term is a change history indicating a predetermined increasing tendency, it is determined that the component of the vehicle 1 is degraded. Alternatively, for example, it may be determined whether the component of the vehicle 1 is degraded, by using a change history of the difference.

When, for example, a period of time taken until the magnitude of the difference becomes less than or equal to a threshold indicates a predetermined increasing tendency, the calculation unit 206 may determine that the component of the vehicle 1 is degraded.

The calculation unit 206, for example, measures a convergence time taken until the magnitude of the difference input to the FB control unit 206*b* shifts from a state greater than a first value to a state where the magnitude of the difference becomes less than or equal to a threshold. When a value obtained by subtracting a reference time from the measured convergence time is longer than a predetermined value, the calculation unit 206 determines that a time taken until the magnitude of the difference becomes less than or equal to a threshold has an increasing tendency. The reference time is a convergence time measured before the component is degraded. The reference time may be, for example, measured empirically or may be measured by the calculation unit 206.

Hereinafter, a process that is executed in the calculation unit 206 of the motion manager 200 in this modification will be described with reference to FIG. 6. FIG. 6 is a flowchart showing an example of the process that is executed in the calculation unit 206 according to the modification. A series of processes shown in the flowchart is repeatedly executed by the calculation unit 206 at predetermined control intervals.

The processes of S100, S102, S104, S106, S108, and S116 in the flowchart of FIG. 6 are the same as the processes of S100, S102, S104, S106, S108, and S116 in the flowchart of FIG. 4. Therefore, the detailed description thereof will not be repeated.

After the required value of driving force is output in S108, the process proceeds to S210. In S210, the calculation unit 206 determines whether the determination condition is satisfied. The determination condition includes a condition that there is a period from when the magnitude of the difference shifts from a state greater than a first value to a state less than or equal to a threshold within an immediate predetermined period. The first value is, for example, a predetermined value and is, for example, adapted empirically. When the calculation unit 206 determines that the determination condition is satisfied (YES in S210), the process proceeds to S212. When the calculation unit 206 determines that the determination condition is not satisfied (NO in S210), the process ends.

In S212, the calculation unit 206 acquires a convergence time taken until the magnitude of the difference becomes less than or equal to a threshold.

In S214, the calculation unit 206 determines whether the convergence time has an increasing tendency. A determining method is as described above, so the detailed description thereof will not be repeated. When the calculation unit 206 determines that the convergence time has an increasing tendency (YES in S214), the process proceeds to S116. When the calculation unit 206 determines that the convergence time has no increasing tendency (NO in S214), the process ends.

When, for example, the degradation of the component of the vehicle occurs, a time taken until the magnitude of a difference between a required value of acceleration and an actually measured value of acceleration becomes less than or equal to a threshold tends to increase as compared to before the degradation occurs. For this reason, when the period of time taken until the magnitude of the difference becomes less than or equal to the threshold indicates a predetermined increasing tendency, it is determined that the component of the vehicle 1 is degraded. Thus, it is possible to accurately determine whether the component of the vehicle 1 is degraded.

In the above-described embodiment, the case where driving force or the like is controlled by using a required value of acceleration in the longitudinal direction of the vehicle 1 and an actually measured value of acceleration in the longitudinal direction of the vehicle 1 has been described as an example. Alternatively, for example, when driving force or the like is controlled by using a required value of angular velocity in the yaw direction of the vehicle 1 and an actually measured value of angular velocity in the yaw direction of the vehicle 1, it may be determined whether the component of the vehicle 1 is degraded as described above, or, when driving force or the like is controlled by using a required value of acceleration in the lateral direction of the vehicle 1 and an actually measured value of acceleration in the lateral direction of the vehicle 1, it may be determined whether the component of the vehicle 1 is degraded as described above. With this configuration, it is possible to accurately determine whether the component of the vehicle 1 is degraded by using a difference between a required value and an actually measured value and a change history of an FB term of a required value of driving force or the like, set by using the difference.

Part or all of the described modifications may be implemented in combination as needed. The embodiment described above is illustrative and not restrictive in all respects. The scope of the disclosure is not defined by the above description, and is defined by the appended claims. The scope of the disclosure is intended to encompass all modifications within the scope of the appended claims and equivalents thereof

What is claimed is:

1. A vehicle control apparatus comprising a sensor and one or more processors, the one or more processors being configured to:
   acquire a first required value of a first parameter regarding an operation of a vehicle from an in-vehicle system configured to set the first required value,
   set a second required value of a second state quantity parameter for an operation of a component of the vehicle by using the first required value of the first parameter;
   acquire a measured value of the first parameter from the sensor;
   set a feedback value for feedback control on the second required value by using a difference between the first required value and the measured value of the first parameter;
   obtain at least one of a plurality of the differences or a plurality of the feedback values when autonomous driving is performed at the vehicle;
   determine whether the component of the vehicle is degraded by using a change of the at least one of the differences or the feedback values; and
   send information to inform a user of the component of the vehicle that is degraded when the component of the vehicle is determined to be degraded.

2. The vehicle control apparatus according to claim 1, wherein:
   the feedback values being integral terms; and
   the one or more processors are configured to determine that the component of the vehicle is degraded when a change of the integral term indicates a predetermined increasing tendency.

3. The vehicle control apparatus according to claim 1, wherein the one or more processors are configured to determine that the component of the vehicle is degraded when a period of time required for a magnitude of the difference to become less than or equal to a threshold indicates a predetermined increasing tendency.

4. The vehicle control apparatus according to claim 1, wherein the first parameter includes at least one of an acceleration of the vehicle in a longitudinal direction, an angular velocity of the vehicle in a yaw direction, or an acceleration of the vehicle in a lateral direction.

5. The vehicle control apparatus according to claim 1, wherein the component of the vehicle includes a component provided as a bush concerned with the operation of the vehicle.

6. The vehicle control apparatus according to claim 1, wherein the one or more processors are configured to set a feedforward value for feedforward control of the second required value by using the first required value.

7. A vehicle control method that is executed by a computer, the vehicle control method comprising:
acquiring a first required value of a first parameter regarding an operation of a vehicle from an in-vehicle system configured to set the first required value,
setting a second required value of a second parameter for an operation of a component of the vehicle by using the first required value of the first parameter;
acquiring a measured value of the first parameter;
setting a feedback value for feedback control on the second required value by using a difference between the first required value and the measured value of the first parameter;
obtain at least one of a plurality of the differences or a plurality of the feedback values when autonomous driving is performed at the vehicle;
determining whether the component of the vehicle is degraded by using a change of the at least one of the differences or the feedback values; and
sending information to inform a user of the component of the vehicle that is degraded when the component of the vehicle is determined to be degraded.

8. A non-transitory storage medium storing instructions that are executable by one or more processors and that cause the one or more processors to perform functions, the functions comprising:
acquiring a first required value of a first parameter regarding an operation of a vehicle from an in-vehicle system configured to set the first required value,
setting a second required value of a second parameter for an operation of a component of the vehicle by using the first required value of the first parameter;
acquiring a measured value of the first parameter;
setting a feedback value for feedback control on the second required value by using a difference between the first required value and the measured value of the first parameter;
obtaining at least one of a plurality of the differences or a plurality of the feedback values when autonomous driving is performed at the vehicle;
determining whether the component of the vehicle is degraded by using a change of at least one of the differences or the feedback values; and
sending information to inform a user of the component of the vehicle that is degraded when the component of the vehicle is determined to be degraded.

* * * * *